United States Patent [19]
Sheridan et al.

[11] Patent Number: 5,617,726
[45] Date of Patent: Apr. 8, 1997

[54] COOLED EXHAUST GAS RECIRCULATION SYSTEM WITH LOAD AND AMBIENT BYPASSES

[75] Inventors: Todd A. Sheridan, Franklin; A. S. Ghuman, Columbus; Angie R. May, Columbus; Rod Radovanovic, Columbus; John M. Janssen, Columbus; Peter V. Woon, Columbus, all of Ind.

[73] Assignee: Cummins Engine Company, Inc., Columbus, Ind.

[21] Appl. No.: 414,492

[22] Filed: Mar. 31, 1995

[51] Int. Cl.⁶ .................................................. F02M 25/07
[52] U.S. Cl. ................................. 60/605.2; 123/570
[58] Field of Search ................. 60/605.2, 280; 123/570

[56] References Cited

U.S. PATENT DOCUMENTS

| | | | |
|---|---|---|---|
| 3,996,748 | 12/1976 | Melchior | 60/605.2 |
| 4,147,141 | 4/1979 | Nagano. | |
| 4,323,045 | 4/1982 | Yamashita | 123/570 |
| 4,426,848 | 1/1984 | Stachowicz | 60/605.2 |
| 5,050,376 | 9/1991 | Stiglic et al. | 60/280 |
| 5,203,311 | 4/1993 | Kitomi et al. . | |
| 5,205,265 | 4/1993 | Kashiyama et al. . | |
| 5,333,456 | 8/1994 | Bollinger | 60/605.2 |
| 5,425,239 | 6/1995 | Gobert | 60/605.2 |

*Primary Examiner*—Michael Koczo
*Attorney, Agent, or Firm*—Sixbey, Friedman, Leedom & Ferguson, P.C.; Charles M. Leedom, Jr.; David S. Safran

[57] ABSTRACT

EGR induction supercharged or turbocharged internal combustion engine having EGR and EGR cooling in which EGR cooling is obtained through jacket water coolers and/or an air-to-air aftercooler. EGR induction is obtained via either low pressure (ambient) induction to the system intake, or via venturi or passive pump induction into the pressurized intake. Bypassing of the EGR cooler is used to reduce condensation and fouling in the EGR cooler and to provide warmer air to reduce light load and cold ambient hydrocarbon production. A passive or catalyzed particulate trap and crankshaft driven supercharger boosting system are provided to address engine response deterioration and particulate increase problems associated with EGR.

23 Claims, 7 Drawing Sheets

COOLED EXHAUST GAS RECIRCULATION SYSTEM WITH LOAD AND AMBIENT BYPASSES

BACKGROUND OF THE INVENTION

1. Field of the Invention

The present invention relates to exhaust gas recirculation (EGR) systems for internal combustion engines. More specifically, the invention is directed to EGR systems of the type which recirculate at least a portion of the engine exhaust gases into the engine air intake system for the purpose of reducing NOx emissions.

2. Description of Related Art

With continued tightening of governmental regulations on vehicular exhaust emission, particularly NOx, not only has the need to recirculate exhaust gases back to the engine intake become apparent, but so has the need to improve upon existing EGR technology.

U.S. Pat. No. 4,147,141 to Nagano discloses an EGR system which includes an EGR pipe for interconnecting an exhaust pipe and an intake pipe of an engine, an EGR cooler being positioned along the EGR pipe, a bypass pipe being arranged parallel to the EGR cooler, a selection valve for controlling the flow of exhaust gas through the EGR cooler bypass and an EGR valve mounted on the EGR pipe for controlling the flow of exhaust gas through the EGR pipe. The disclosed system operates to bypass exhaust gas around the EGR cooler under low exhaust gas temperature conditions while still providing exhaust gas recirculation, thus, avoiding overcooling of the gas and accumulation of carbon and condensation while reducing $NO_x$ emissions when exhaust temperatures are low.

However, because the EGR pipe of Nagano is closed by the EGR valve until engine load and engine temperature reach prescribed minimum values, no exhaust gas is recirculated, for example, under no or very low load, low engine temperature conditions, thereby increasing engine emissions under such circumstances. Furthermore, this disclosure is silent as to how this EGR system might be implemented on an engine having a supercharger or turbocharger compressor so as to avoid starving the turbine or diluting the charge and reducing the air/fuel ratio.

U.S. Pat. No. 5,203,311 to Hitomi et al. discloses an EGR system for recirculating exhaust gas from an exhaust passage through an exhaust gas cooler for return to an intake passage upstream of an engine driven supercharger and an intake air cooler to recirculate cooled exhaust gas for reducing $No_x$. A bypass passage is provided to bypass exhaust gas around the cooler to the intake passage downstream of the supercharger during light load conditions to advantageously supply hot exhaust gas to the engine. A first control valve is positioned along the bypass passage to control flow therethrough and a second control valve is positioned downstream of the cooler to control the recirculation flow of exhaust gas. The bypass flow and cooled flow are directed into the intake passage on opposite sides of the supercharger, but another bypass passage may direct the cooled flow into the intake passage downstream of the supercharger. An embodiment which includes a turbocharger/compressor is also disclosed.

However, the Hitomi et al. patent fails to recognize the advantages of bypassing the cooler during start-up to reduce condensation in the piping and cooler, and thus, causes both control valves to be closed tinder no load and very light load conditions and to operate independent of engine operating temperature conditions. Furthermore, the Hitomi et al. patent fails to disclose an EGR system wherein the bypass flow and the cooled flow from the cooler are both directed into the intake passage on the upstream side of a supercharger or turbocharger. Moreover, the EGR system of this patent does not use a venturi, or a passive pump like an ejector, for directing the low pressure exhaust gas into the intake gases.

U.S. Pat. No. 5,205,265 to Kashiyama et al. discloses an EGR system for an internal combustion engine in which an exhaust gas recirculation pipe recirculates exhaust gas through a cooler into an intake pipe upstream of a supercharger and an intercooler wherein a bypass pipe branches off of the recirculation pipe to allow exhaust gas to bypass the EGR cooler during low load conditions. Under normal operating conditions the recirculated exhaust gas is directed back into the intake passage upstream of the supercharger. However, during low load conditions, the bypass pipe and a control valve are used to bypass gas back into an exhaust pipe and therefore the bypass flow is not returned to the intake flow during light load conditions, resulting in increased low load emissions.

SUMMARY OF THE INVENTION

In view of the foregoing, it is a primary object of the present invention to provide an exhaust gas recirculation (EGR) system in which an EGR cooler can be used to minimize emission without the problems associated with cooling EGR gases.

In keeping with the foregoing object, it is an associated object of the present invention to effectively utilize a supercharger or turbocharger for reducing problems associated with EGR.

Also in furtherance of the initial object, it is another object of the invention to utilize passive or catalyzed particulate trap to address problems associated with EGR.

Yet another object of the present invention is to provide an effective means for achieving EGR induction supercharged or turbocharged internal combustion engine having EGR and EGR cooling means.

These and other objects of the present invention are achieved in accordance with preferred embodiments of the present invention in which EGR cooling is obtained through jacket water coolers and/or an air-to-air aftercooler; but, air-to-exhaust, air-to-charge and jacket water-to-exhaust cooler is also contemplated. EGR induction is obtained via either low pressure (ambient) induction to the system intake or venturi induction to the pressurized intake. A passive pump, like an ejector, can also be used instead of a venturi for induction into the pressurized intake. Bypassing of the EGR cooler is used to reduce condensation and fouling in the EGR cooler and to provide warmer air to reduce light load and cold ambient hydrocarbon production. A passive or catalyzed trap and boosting system are provided to address engine response deterioration and particulate increase problems associated with EGR.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

In the drawings, elements which are unchanged from one embodiment to another bear the same reference numeral while an element that has been modified from one embodiment to another is distinguished by a prime (') symbol.

DETAILED DESCRIPTION OF THE PREFERRED EMBODIMENTS

Figure 1:
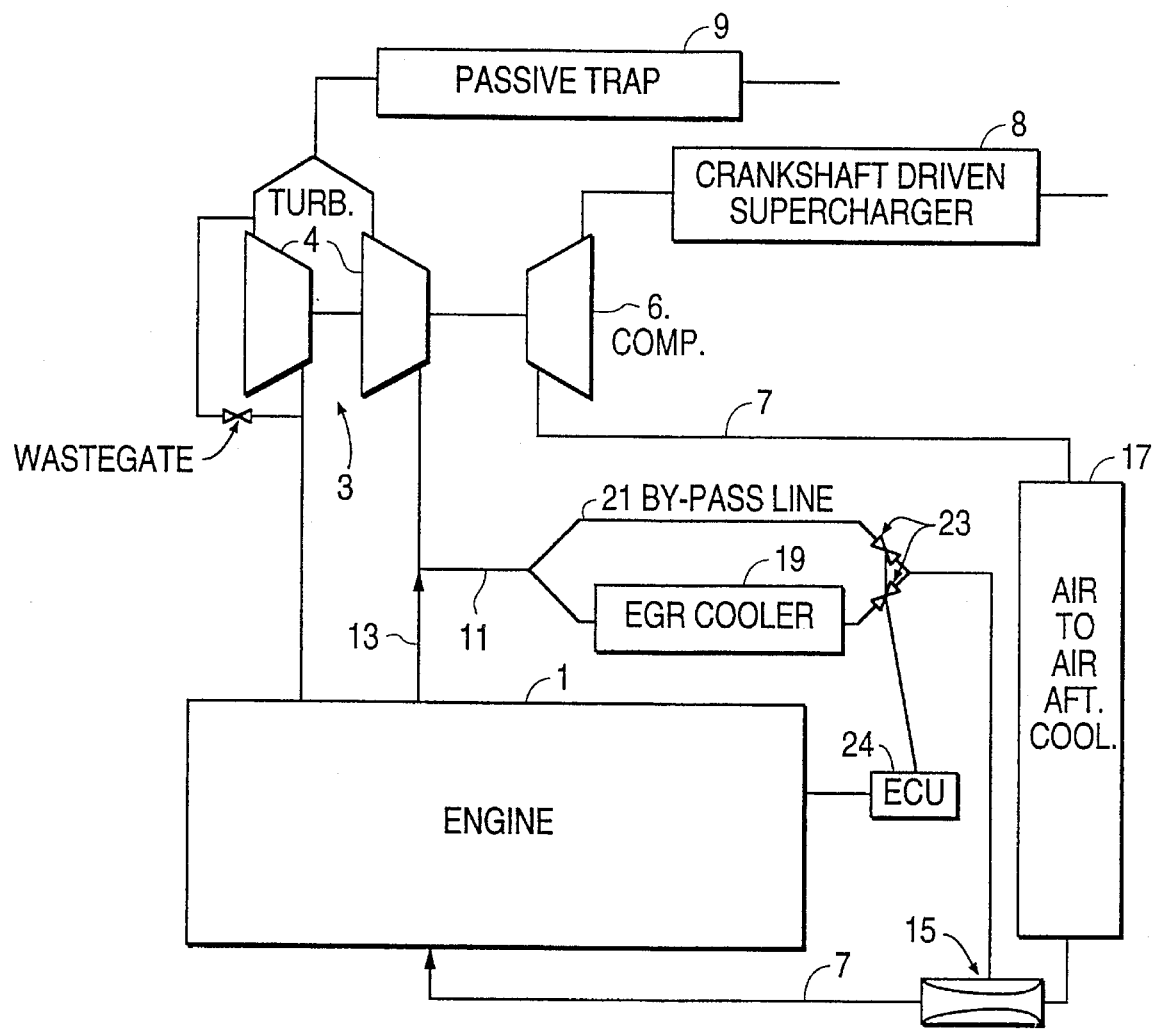
FIG. 1 shows a first embodiment of the invention utilizing venturi or passive pump induction.

FIG. 1 shows a first embodiment of a cooled EGR system in accordance with the present invention. In this embodiment, exhaust gases produced by an engine 1 are directed to a twin entry turbocharger 3 which can be provided with wastegate. In this way, exhaust energy acting on the turbines 4 drives a compressor 6 to boost air intake pressure in air intake line 7 which delivers combustion air to the engine 1 from a crankshaft driven supercharger 8. After passing through the turbocharger 3, the exhaust gases are passed through a passive (or catalyzed) trap 9. An EGR line 11 branches off of the exhaust line 13 upstream of the turbocharger and exhaust gases are drawn into this line at charge pressure via a venturi or passive pump 15 in the intake line 7 downstream of an air-to-air cooler 17. The EGR line 11 has an EGR cooler 19 disposed therein and a by-pass line 21 for by-passing the EGR cooler 19. A pair of independently opening two-way EGR valves 23 that may be either poppet valves or butterfly valves which can be used in an on/off manner or in a modulated manner with opening and closing forces being supplied pneumatically or electrically in response to a control signal which is received from an electronic control unit ECU 24 as a function of outputs from engine sensors which monitor engine fueling, load and temperature in a conventional manner, e.g., using sensors that detect engine rpm, throttle position, and/or intake air pressure, and engine coolant and/or exhaust gas temperature.

EGR cooling allows reduced NOx emissions to be achieved and by increasing the charge density particulate emissions can be reduced, especially when the engine is operating under low speed, high load conditions where the air/fuel ratio is relatively low. On the other hand, by bypassing the EGR cooler 19 during light load operating conditions and when engine temperature is low, problems of cooler fouling (particulate matter at light load tends to be of a more "sticky" consistency) and engine misfiring can be reduced or eliminated by raising the end of compression temperatures.

The inclusion of the crankshaft driven supercharger 8 in addition to the turbocharger 3 (hybrid boosting) eliminates a potential loss of response (due to the diversion of exhaust from the turbine 4 to the EGR line 11) and/or an increase in transient particulate by keeping air/fuel ratios high at low speed, high load operation and during transient operation. The passive particulate or catalyzed trap also controls transient particulate and provides a means to meet anticipated very stringent future particulate standards.

Figure 2:
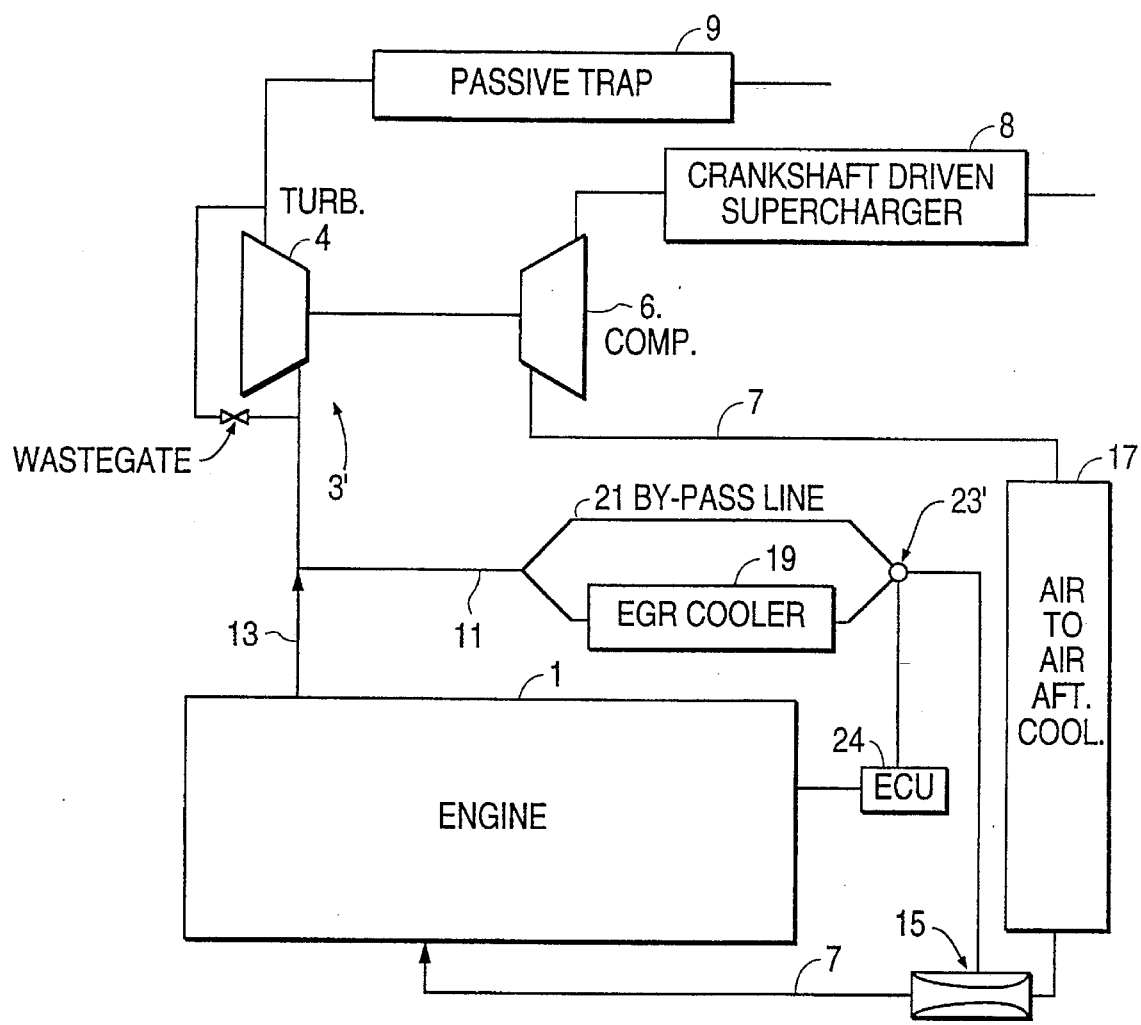
FIG. 2 shows a variation of the venturi or passive pump induction embodiment of FIG. 1.

FIG. 2 shows a variation of the FIG. 1 EGR system in which the twin entry turbine turbocharger 3 is replaced by a single entry turbine turbocharger 3' and a single three-way valve 23' with an off position replaces the pair of two-way valves 23. Apart from these changes the structure and operation is the same, and while turbine 4 is shown as being wastegated in FIG. 2, such is optional. Likewise, the three-way valve 23' of FIG. 2 could be used with the twin entry turbine turbocharger 3 shown in FIG. 1.

Figure 3:
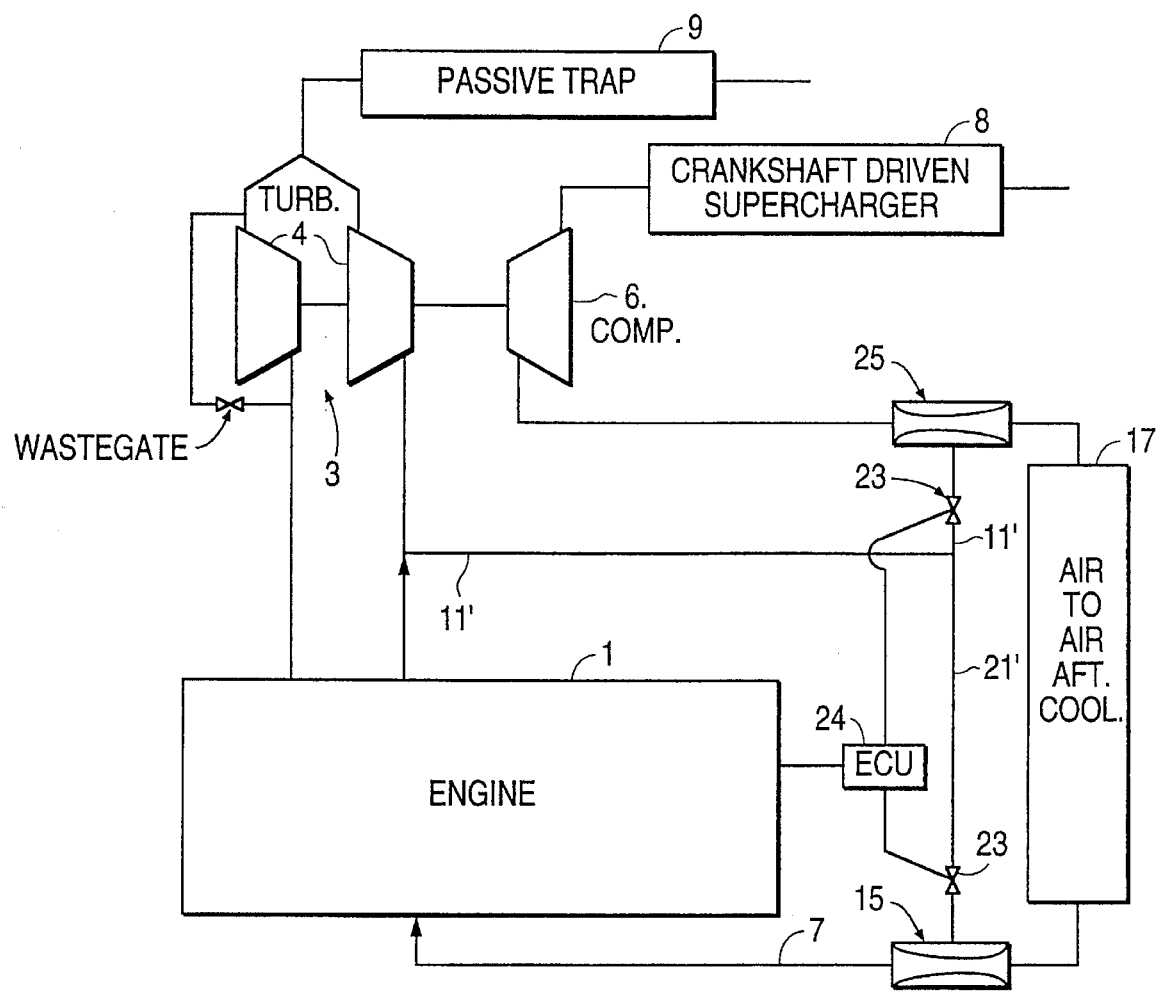
FIG. 3 shows a embodiment of the invention utilizing venturi or passive pump induction without a separate EGR cooler.

In contrast, FIG. 3 shows an embodiment which differs in more significant respects in that no separate EGR cooler (19 in FIGS. 1 & 2) is provided in EGR line 11' and this system uses the air to air aftercooler 17 to simultaneously cool both the charge air and the exhaust gas. As in the FIG. 1 embodiment, an independently opening two-way EGR valve 23 is provided for the bypass line 21' as well as the EGR line 11' and they may be either poppet valves or butterfly valves which can be used in an on/off manner or in a modulated manner with opening and closing forces being supplied pneumatically or electrically for by-passing the EGR cooler 19 during light load operating conditions and when engine temperature is low to solve the above-described problems of cooler fouling and engine misfiring. However, because of the fact that, in this embodiment, the bypass line 21' bypasses the air to air cooler 17 and the EGR line 11' does not, a second venturi or passive pump 25 is provided downstream of the air to air cooler 17 to draw EGR gases through bypass line 21' when its valve 23 is open and the valve 23 in EGR line 11' is closed.

Figure 4:
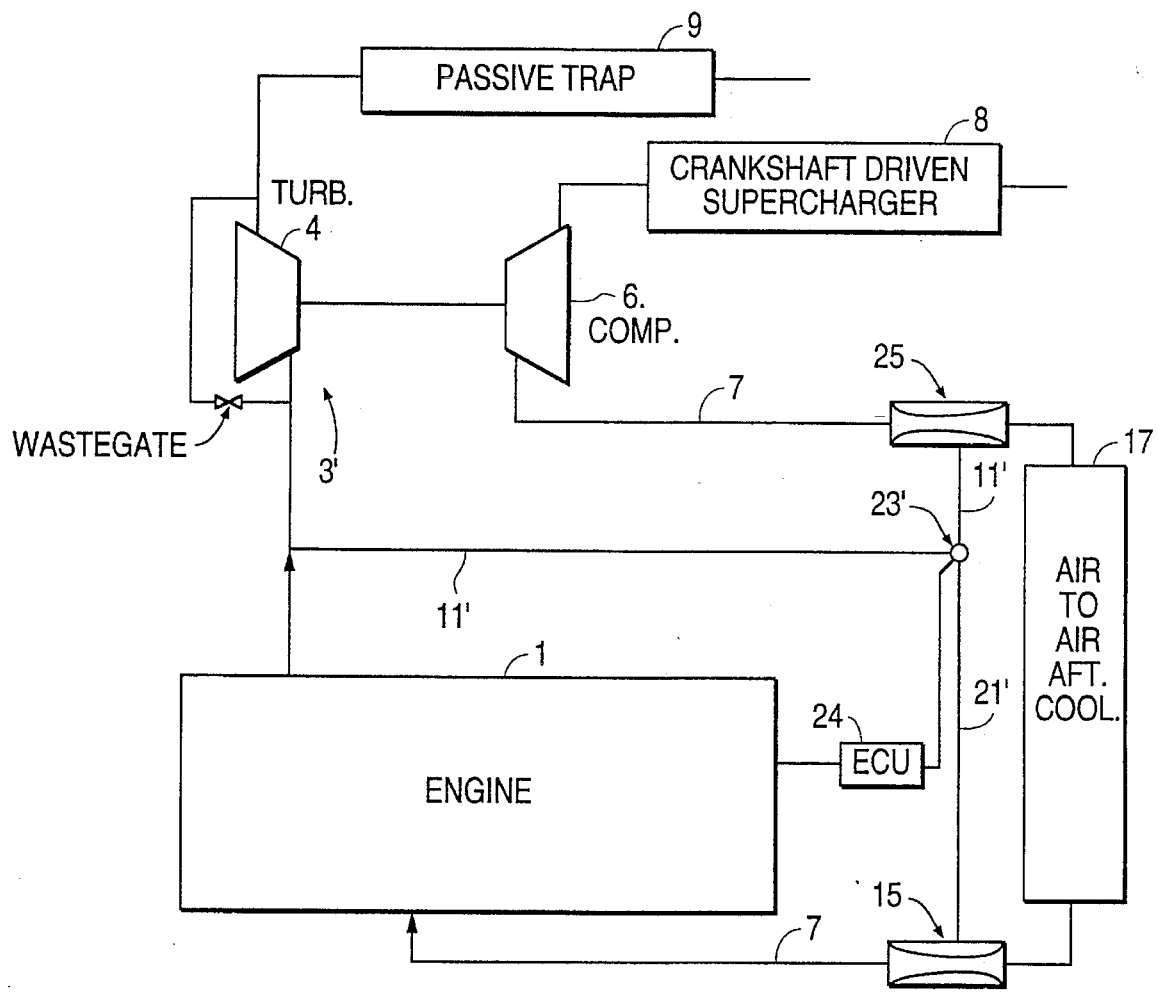
FIG. 4 shows another embodiment of the invention utilizing venturi or passive pump induction without a separate EGR cooler.

FIG. 4 shows application of the FIG. 2 variation to the embodiment of FIG. 3, a single three-way valve 23' with an off position replacing the pair of two-way valves 23, and with a single entry turbine turbocharger 3' replacing the twin entry turbine turbocharger 3. Otherwise, FIG. 4 shares the attributes of the FIG. 3 embodiment with respect to use of the air-to-air aftercooler 17 to simultaneously cool both the charge air and the exhaust gas.

Figure 5:
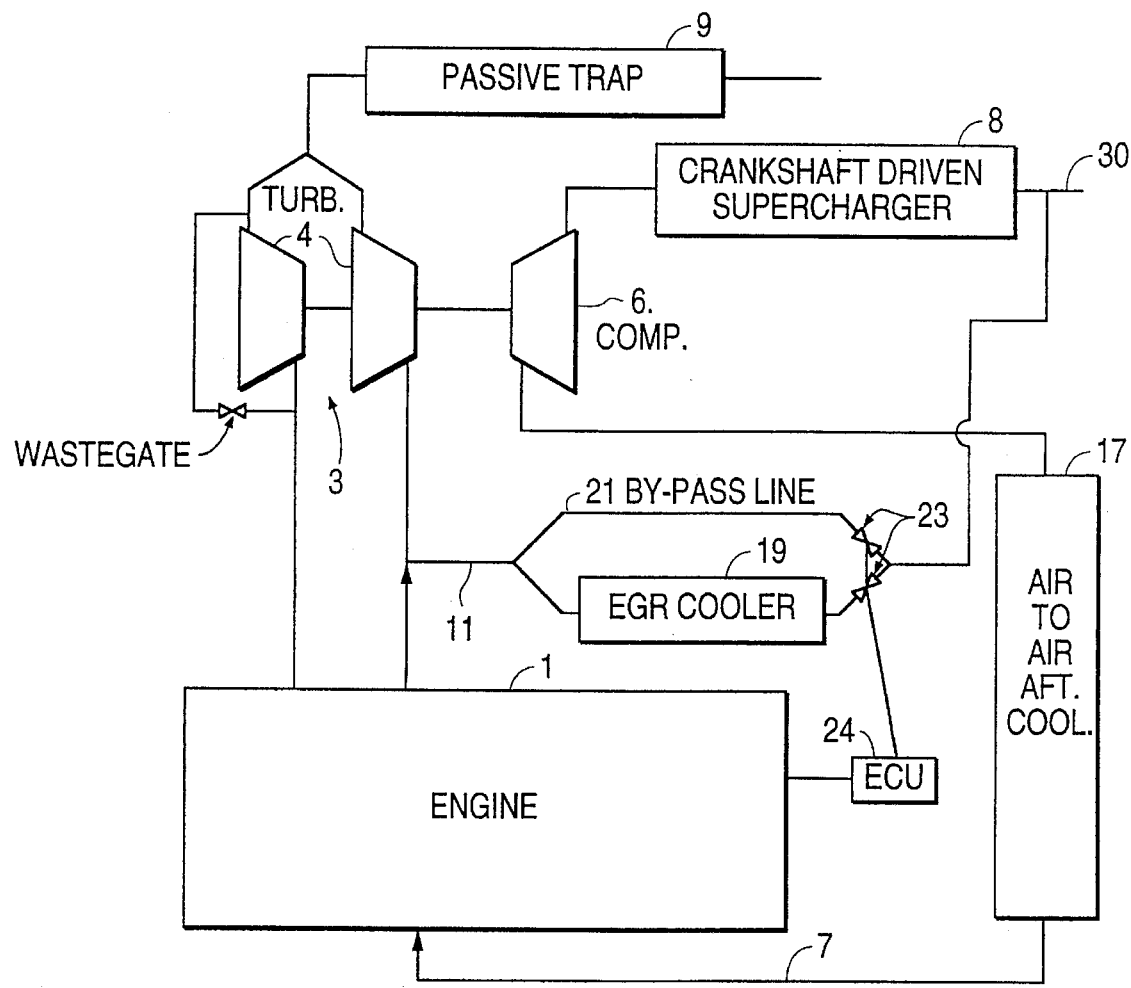
FIG. 5 shows an embodiment of the invention corresponding to that of FIG. 1 but with low pressure induction.
Figure 6:
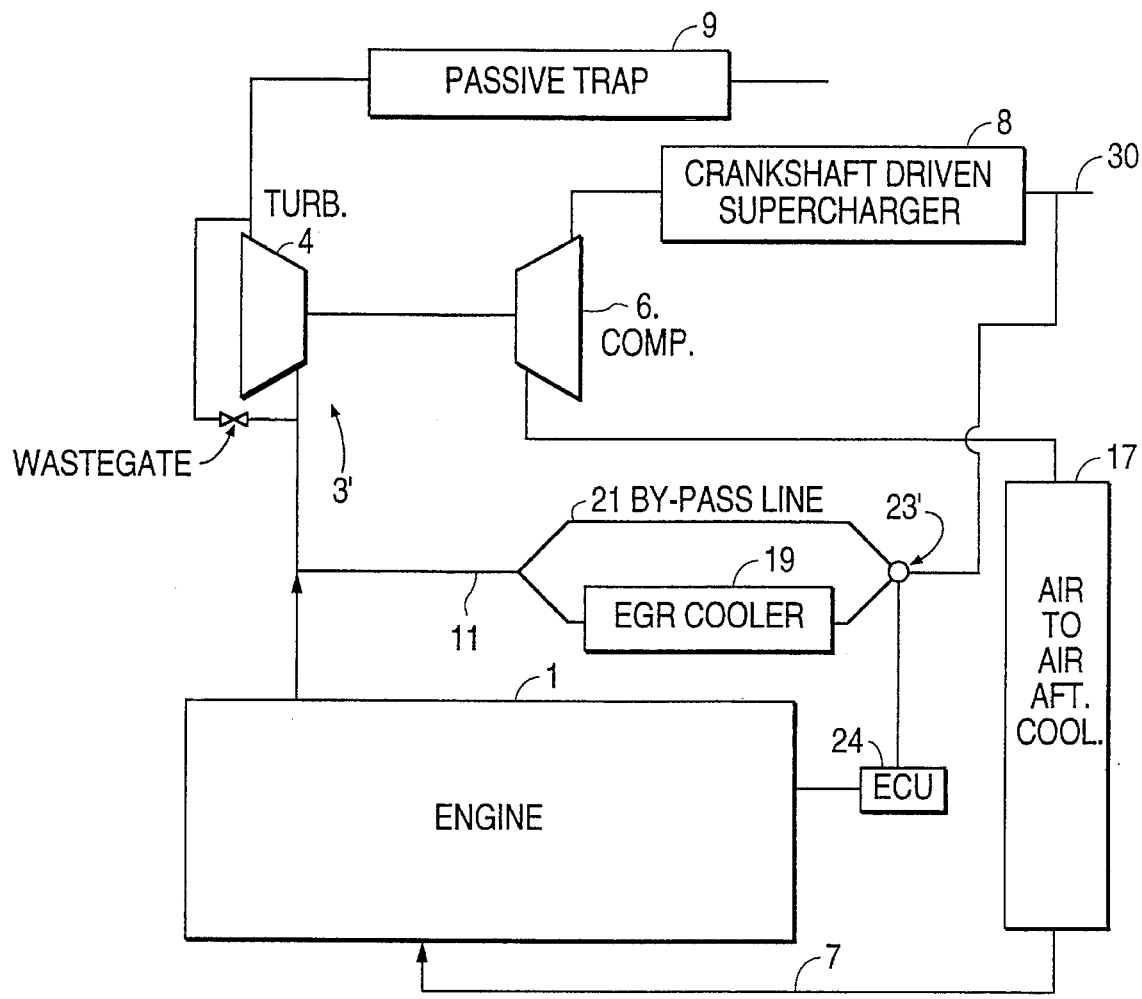
FIG. 6 shows an embodiment of the invention corresponding to that of FIG. 2 but with low pressure induction.

Another embodiment of the invention is shown in FIG. 5. This embodiment is similar to that of FIG. 1 but differs with respect to the point of introduction of the exhaust gas to the charge. Instead of using a venturi to introduce the exhaust gas into the pressurized intake downstream of compressor 6 and supercharger 8, in this embodiment, the recirculated exhaust is introduced at ambient pressure upstream thereof at the system inlet 30. FIG. 6 merely differs from FIG. 5 in that it shows implementation of the ambient pressure exhaust feature in a context corresponding to that of the FIG. 2 variation.

Figure 7:
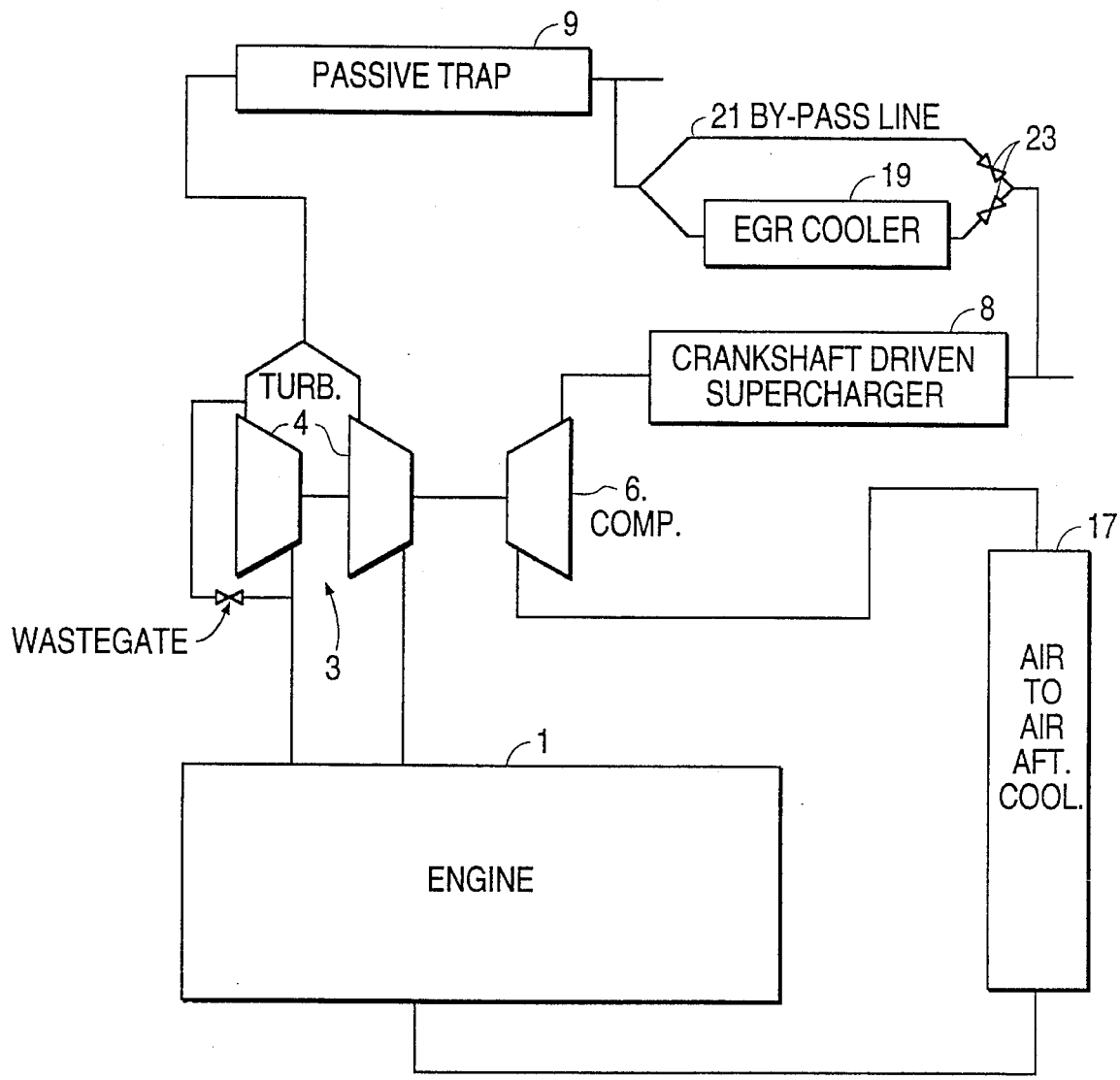
FIG. 7 shows a variation of the FIG. 5 embodiment in which a passive trap is positioned in the EGR flow.

FIG. 7 shows one more variation of the FIG. 5 embodiment that is possible in accordance with the present invention. In this case, the passive (or catalyzed) trap 9 is positioned in the EGR flow path, and low pressure exhaust downstream of the trap 9 is drawn through the EGR cooler 19 or the bypass line 21. This variation can also be used with all of the above-described configurations as well, and offers the potential advantages of being able to reduce the size of particulate trap, making it easier to regenerate, and reducing the particulate introduced into the intake. Furthermore, such a configuration would reduce fouling of the cooler 19 with particulate.

While various embodiments in accordance with the present invention have been shown and described, it is understood that the invention is not limited thereto, and is susceptible to numerous changes and modifications as known to those skilled in the art. For example, it should be appreciated that the figures are not intended to represent required sets of hardware for each system, and the elements may be mixed and matched to form numerous other combinations of these elements. Likewise, while the described use of the crankshaft driven supercharger 8 and passive trap 9 is preferred, either or both of these components may be omitted. Still further, while pneumatic or electrical actuation of popper or butterfly valves is described above, other types of valves, e.g., guillotine, gate, globe, etc. and other manners of actuation, e.g., hydraulic, can readily be utilized instead. Therefore, this invention is not limited to the details shown and described herein, and includes all such changes and modifications as are encompassed by the scope of the appended claims.

Industrial Applicability

The present invention will find applicability for use on a wide range of engine types for purposes of meeting stringent emissions regulations, particularly those applicable to vehicular Diesel engines.

We claim:

1. An exhaust gas recirculation system for an internal combustion engine by which a portion of exhaust gases produced by the engine are recirculated from an exhaust line of the engine into an intake line of the engine, said exhaust gas recirculation system comprising an exhaust gas recirculation line connecting the exhaust line of the engine to the intake line of the engine, cooler means for cooling the recirculated portion of the exhaust gases, a bypass line extending from said recirculation line in bypassing relationship to said cooler means, and valve means for directing the recirculated portion of the exhaust gases to said intake line via said bypass line under low engine temperature operating conditions and under low engine load operating conditions, and via said cooler means under other engine operating conditions; wherein an engine driven supercharger is disposed in the intake line; and wherein the recirculated portion of the exhaust gases is introduced into the intake line by induction.

2. An exhaust gas recirculation system according to claim 1, wherein said recirculation line communicates with said intake line in a pressurized portion thereof downstream of the supercharger.

3. An exhaust gas recirculation system according to claim 2, wherein a venturi is disposed in said pressurized portion of the intake line and wherein said recirculation line is connected to said pressurized portion via said venturi, said venturi serving as a means for inducting low pressure exhaust gases from said exhaust line, through the recirculation line and into the pressurized portion of the intake line.

4. An exhaust gas recirculation system according to claim 3, wherein an air to air aftercooler is disposed between said supercharger and said venturi.

5. An exhaust gas recirculation system according to claim 4, wherein said bypass line extends from a portion of said recirculation line upstream of said cooler means to a portion of said recirculation line downstream of said cooler means.

6. An exhaust gas recirculation system according to claim 3, wherein said bypass line extends from a portion of said recirculation line upstream of said cooler means to a portion of said recirculation line downstream of said cooler means.

7. An exhaust gas recirculation system according to claim 3, wherein a particulate trap is provided in said exhaust line.

8. An exhaust gas recirculation system according to claim 4, wherein said cooler means is formed by said aftercooler; wherein the venturi to which said recirculation line is connected is located upstream of said aftercooler; wherein a second, bypass venturi is located in a portion of said intake line downstream of said aftercooler; and wherein said bypass line extends from an intermediate portion of said recirculation line to said bypass venturi, the bypass venturi serving as a means for inducting low pressure exhaust gases from said exhaust line, through the recirculation line and into the pressurized portion of the intake line upstream of said aftercooler.

9. An exhaust gas recirculation system according to claim 8, wherein a particulate trap is provided in said exhaust line.

10. An exhaust gas recirculation system according to claim 1, wherein said recirculation line communicates with said intake line in an ambient pressure portion thereof upstream of the supercharger.

11. An exhaust gas recirculation system according to claim 10, wherein an air to air aftercooler is disposed in said intake line downstream of said supercharger.

12. An exhaust gas recirculation system according to claim 11, wherein said bypass line extends from a portion of said recirculation line upstream of said cooler means to a portion of said recirculation line downstream of said cooler means.

13. An exhaust gas recirculation system according to claim 10, wherein said bypass line extends from a portion of said recirculation line upstream of said cooler means to a portion of said recirculation line downstream of said cooler means.

14. An exhaust gas recirculation system according to claim 10, wherein a particulate trap is provided in said exhaust line.

15. An exhaust gas recirculation system according to claim 1, further comprising an exhaust gas driven turbo-compressor having at least one turbine in said exhaust line and an intake air boost compressor in said intake line.

16. An exhaust gas recirculation system according to claim 15, wherein the engine driven supercharger is disposed in the intake line upstream of said compressor.

17. An exhaust gas recirculation system according to claim 16, wherein said exhaust line has a pair of parallel branches; and wherein said at least one turbine comprises a pair of turbines, one in each of said parallel branches.

18. An exhaust gas recirculation system according to claim 17, wherein one of said turbines is wastegated.

19. An exhaust gas recirculation system according to claim 16, wherein a particulate trap is provided in said exhaust line downstream of said at least one turbine.

20. An exhaust gas recirculation system according to claim 19, wherein said particulate trap is located upstream of said recirculation line.

21. An exhaust gas recirculation system according to claim 2, wherein a passive pump is disposed in said pressurized portion of the intake line and wherein said recirculation line is connected to said pressurized portion via said passive pump, said passive pump serving as a means for inducting low pressure exhaust gases from said exhaust line, through the recirculation line and into the pressurized portion of the intake line.

22. An exhaust gas recirculation system according to claim 21, wherein an air to air aftercooler is disposed between said supercharger and said passive pump.

23. An exhaust gas recirculation system according to claim 22, wherein said cooler means is formed by said aftercooler; wherein the passive pump to which said recirculation line is connected is located upstream of said aftercooler; wherein a second, bypass passive pump is located in a portion of said intake line downstream of said aftercooler; and wherein said bypass line extends from an intermediate portion of said recirculation line to said bypass passive pump, the bypass passive pump serving as a means for inducting low pressure exhaust gases from said exhaust line, through the recirculation line and into the pressurized portion of the intake line upstream of said aftercooler.

* * * * *